(12) United States Patent
Hiramatsu

(10) Patent No.: US 10,274,940 B2
(45) Date of Patent: Apr. 30, 2019

(54) MANAGEMENT SYSTEM

(71) Applicant: FANUC Corporation, Yamanashi (JP)

(72) Inventor: Akio Hiramatsu, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 182 days.

(21) Appl. No.: 15/411,560

(22) Filed: Jan. 20, 2017

(65) Prior Publication Data

US 2017/0212503 A1   Jul. 27, 2017

(30) Foreign Application Priority Data

Jan. 21, 2016 (JP) .................................. 2016-009978

(51) Int. Cl.
*G05B 19/418* (2006.01)
(52) U.S. Cl.
CPC .. *G05B 19/418* (2013.01); *G05B 2219/23398* (2013.01); *Y02P 90/02* (2015.11)
(58) Field of Classification Search
CPC  G05B 19/418; G05B 19/4155; G05B 19/404; G05B 2219/23398; G05B 2219/49219; B23Q 15/00; B23Q 11/44; B23Q 11/0003; B23Q 41/00; G05D 23/19; G05D 23/1951
USPC .............. 340/680, 679, 588, 825.22, 825.23; 700/275, 299
See application file for complete search history.

(56) References Cited

U.S. PATENT DOCUMENTS

| 2003/0185559 | A1* | 10/2003 | Yoshida | G03D 15/022 396/571 |
| 2013/0211598 | A1* | 8/2013 | Fujii | G05B 19/404 700/275 |
| 2015/0112503 | A1 | 4/2015 | Matsumoto | |
| 2016/0124416 | A1* | 5/2016 | Besuchet | G05B 19/042 700/173 |

FOREIGN PATENT DOCUMENTS

| JP | 2010-250384 A | 11/2010 |
| JP | 2013-238914 A | 11/2013 |
| JP | 2015080835 A | 4/2015 |

OTHER PUBLICATIONS

Japanese Office Action for Japanese Application No. 2016-009978, dated Dec. 19, 2017, 8 pages.

* cited by examiner

*Primary Examiner* — Hung T Nguyen
(74) *Attorney, Agent, or Firm* — Hauptman Ham, LLP

(57) ABSTRACT

A management system outputs at least one of a start-up start time and a warming start time of a plurality of machines. An input unit receives the input of a machining start time and the largest number of the machines. An estimation unit estimates a start-up period, a warming period, and a process period of each of the plurality of machines. A determination unit determines at least one of a start-up start time and a warming start time of each of the plurality of machines based on the machining start time, the largest number of the machines, the start-up period, the warming period, and the process period. A notification unit notifies at least one of the start-up start time and the warming start time.

8 Claims, 15 Drawing Sheets

MANAGEMENT SYSTEM

RELATED APPLICATIONS

The present application claims priority to Japanese Patent Application Number 2016-009978, filed Jan. 21, 2016, the disclosure of which is hereby incorporated by reference herein in its entirety.

BACKGROUND OF THE INVENTION

1. Field of the Invention

The present invention relates to a management system that provides optimal warming start times of a plurality of machines.

2. Description of the Related Art

In a machine tool or industrial machinery (hereinafter referred to simply as a machine), a warming operation is sometimes necessary to avoid a thermal displacement. However, a warming operation consumes an amount of electric power equivalent to that for an operation during machining. Therefore, it is required to cut an unnecessary warming period and optimize the warming period.

In this regard, Japanese Patent Application Publication No. 2015-80835 discloses a technique of optimizing a warming period in a single machine.

However, the technique disclosed in Japanese Patent Application Publication No. 2015-80835 serves to optimize a warming period of one machine, and no technique is disclosed therein which would optimize warming periods of a plurality of machines.

SUMMARY OF THE INVENTION

The present invention has been made to solve such a problem and an object thereof is to provide a management system capable of preventing unnecessary power consumption by providing optimal warming start times of a plurality of machines.

A management system according to an embodiment of the present invention is a management system that outputs at least one of a start-up start time and a warming start time of a plurality of machines, the management system including: an input unit that receives the input of a machining start time and the largest number of the machines; an estimation unit that estimates a start-up period, a warming period, and a process period of each of the plurality of machines; a determination unit that determines at least one of a start-up start time and a warming start time of each of the plurality of machines based on the machining start time, the largest number of the machines, the start-up period, the warming period, and the process period; and a notification unit that notifies at least one of the start-up start time and the warming start time.

In a management system according to another embodiment, the determination unit further determines at least one of a start-up end time and a warming end time of each of the plurality of machines, and the notification unit further notifies at least one of the start-up end time and the warming end time.

In a management system according to another embodiment, the input unit receives the input of the machining start time of each of the plurality of machines.

A management system according to another embodiment further includes a data collection unit that collects environment data and at least one of a start-up period, a warming period, and a process period of each of the machines; and a database unit that accumulates the environment data at a predetermined time in correlation with at least one of the start-up period, the warming period, and the process period at the predetermined time, and the estimation unit estimates the start-up period, the warming period, and the process period of each of the plurality of machines based on the environment data during a machining time and the environment data and at least one of the start-up period, the warming period, and the process period accumulated in the past in the database unit.

In a management system according to another embodiment, the input unit further receives the input of information indicating a machining time.

In a management system according to another embodiment, the notification unit notifies at least one of the start-up start time, the warming start time, the start-up end time, and the warming end time via audio or screen display.

In a management system according to another embodiment, the notification unit notifies at least one of the start-up start time, the warming start time, the start-up end time, and the warming end time associated with each of the plurality of machines to a notification destination determined for each of the plurality of machines.

In a management system according to another embodiment, the notification unit sends a notification to the machine of which the warming start time has arrived.

According to the present invention, it is possible to provide a management system capable of preventing unnecessary power consumption by providing the optimal warming start times of a plurality of machines.

BRIEF DESCRIPTION OF THE DRAWINGS

These and other objects and features of the present invention will become more apparent from the description of the following embodiments with reference to the accompanying drawings, in which.

DETAILED DESCRIPTION OF THE PREFERRED EMBODIMENTS

First, the background of the present invention will be described. The present invention assumes the presence of n (n=1, 2, 3, . . . ) machines. Moreover, the following periods are defined for description of the present invention.

A start-up period n is a period necessary for an operator to perform a start-up operation of machine n. An example of the start-up operation includes an operation of correcting the position and the rotating axis of a tool or a work.

A warming period n is a period necessary for a warming operation of machine n.

A process period n is a period necessary for a process n executed in machine n. When a workpiece is conveyed sequentially through respective processes as in a machining line, the process period n is defined as the sum of "period necessary for machining by machine n" and "period necessary for conveying workpiece from machine n to machine n+1". In this case, the machining start times of respective machines are successive. That is, after the process period n of machine n ends, the process period n+1 of machine n+1 starts. On the other hand, when the machining start times of respective machines are independent unlike a machining line or the like, the process period n is defined as "period necessary for machining by machine n".

Figure 1:
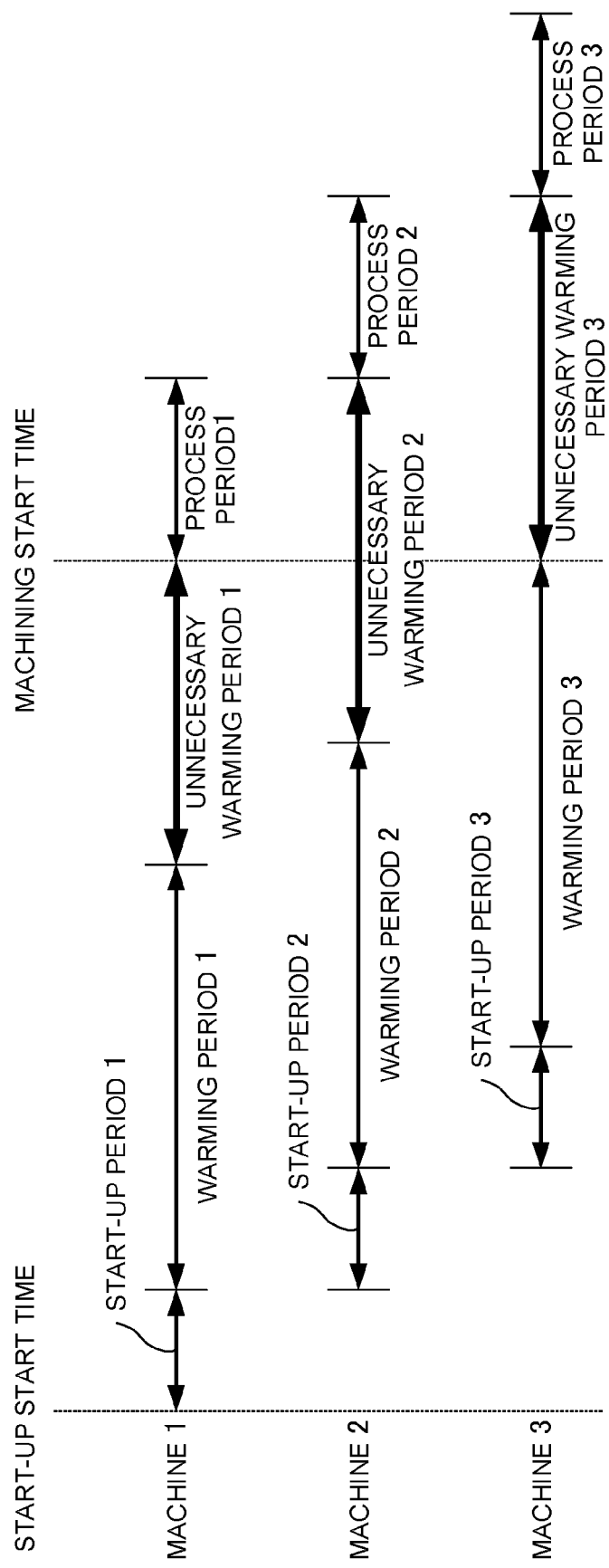
FIG. 1 is a time chart when an operator in a machining line checks the end of a warming operation on all machines and then starts a machining process.
Figure 2:
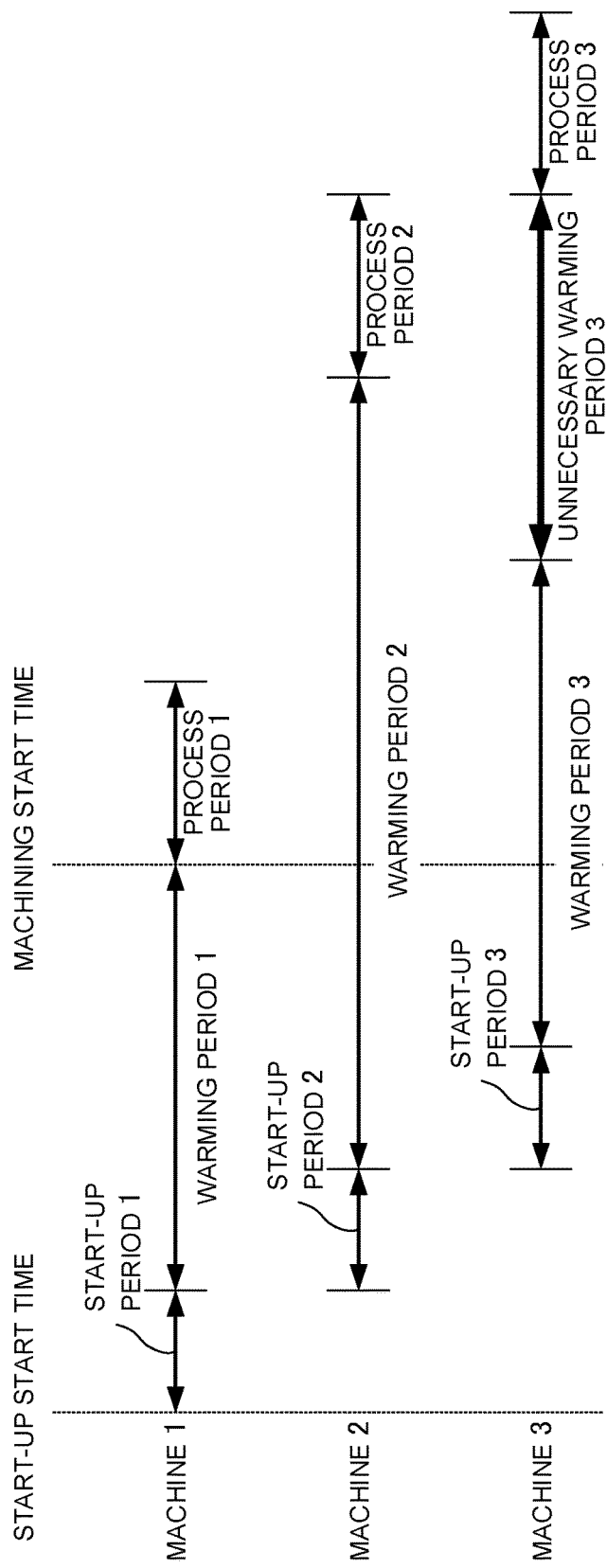
FIG. 2 is a time chart when an operator in a machining line checks the end of a warming operation of machine 1 and then starts a machining process.
Figure 3:
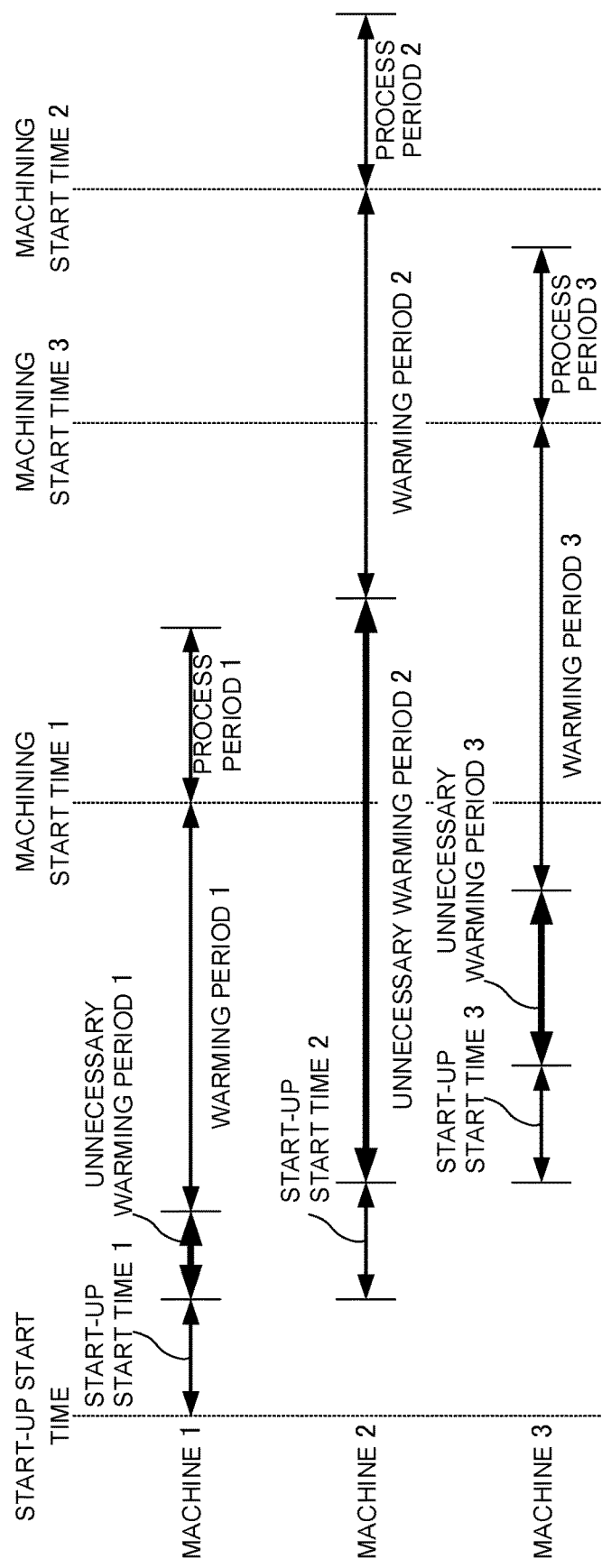
FIG. 3 is a time chart when the start times of the machining processes of respective machines are independent.

FIGS. 1 to 3 illustrate a typical relation between a start-up period, a warming period, and a process period when a plurality of machines execute respective processes.

FIG. 1 is a time chart when an operator in a machining line checks the end of a warming operation on all machines and then starts a machining process. FIG. 2 is a time chart when an operator in a machining line checks the end of a warming operation of machine 1 and then starts a machining process. In a machining line, it is necessary to perform a plurality of processes successively. In the examples of FIGS. 1 and 2, it is assumed that machine 1 executes a process for process period 1, machine 2 executes a process for process period 2, and then, machine 3 executes a process for process period 3. On the other hand, FIG. 3 is a time chart when the start times of the machining processes of respective machines are independent.

In the example of FIG. 1, an unnecessary warming period occurs in all machines. Moreover, in the example of FIG. 2, although an unnecessary warming period in machines 1 and 2 is removed, it is necessary to adjust a period for conveying a workpiece from machine 1 to machine 2 in the first machining. Furthermore, an unnecessary warming period still occurs in machine 3. Therefore, this method is not an optimal solving method. In the example of FIG. 3, an unnecessary warming period occurs in all machines.

Although it is assumed here that an operator performs an operation by himself or herself, a case in which a plurality of operators performs a start-up operation simultaneously may be considered. However, generally, one operator manages a plurality of machines, for the purpose of minimizing a labor cost, etc.

The examples illustrated in FIGS. 1 to 3 have the following problems. When a warming operation starts immediately after each machine performs a start-up operation, a time difference may occur between a start-up period, a warming period, and a process period of respective machines and an unnecessary warming period may occur.

Moreover, the period necessary for a warming operation is roughly determined (generally approximately 1 to 2 hours). However, when management of a warming period is assigned to an operator, the operator may forget that a warming operation is being performed and a necessary period may elapse. In this case, an unnecessary warming period also occurs.

When an unnecessary warming period occurs in this manner, each machine consumes unnecessary electric power. Moreover, when the operator forgets that the warming operation is being performed, there is a problem that it is not possible to start machining at a desired machining start time.

Therefore, the management system according to the present invention provides optimal warming start times of a plurality of machines. In this way, it is possible to solve the above-described problem and to prevent unnecessary power consumption.

Embodiment

Figure 4:
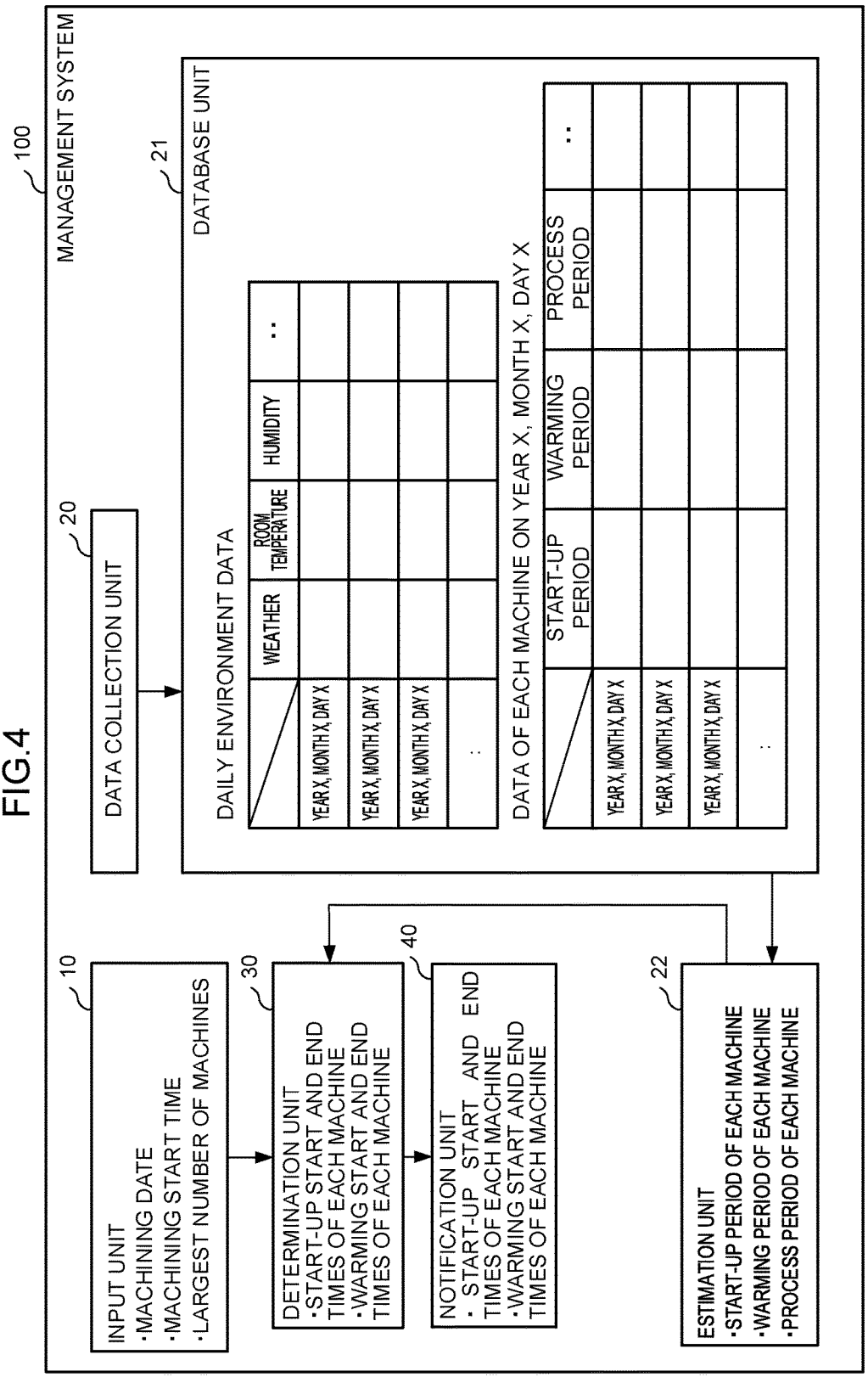
FIG. 4 is a block diagram illustrating a configuration of a management system 100.

First, a configuration of a management system 100 according to an embodiment of the present invention will be described with reference to a block diagram of FIG. 4.

The management system 100 includes an input unit 10, a data collection unit 20, a database unit 21, an estimation unit 22, a determination unit 30, and a notification unit 40. A typical management system 100 is an information processing device having a processor, a storage device, and the like, and the processor executes a program stored in the storage device whereby the processing units 10 to 40 described above are logically implemented.

The input unit 10 receives the input of a machining date, a machining start time, and the largest number of the machines. Typically, the input unit 10 acquires a user's input, output values from other systems, and the like via an input interface (not illustrated).

The data collection unit 20 collects environment data (weather, room temperature, humidity, and the like) and machine data (a start-up period, a warming period, a process period, and the like) of each of a plurality of machines on a daily basis. Typically, the data collection unit 20 acquires output values of various sensors, a user's input, and the like via an input interface (not illustrated).

The database unit 21 is a storage area in which data collected by the data collection unit 20 is accumulated. Typically, as illustrated in FIG. 4, the database unit 21 has a table that correlates date and each item of environment data with each other and a table that correlates date and machine data with each other. The table that correlates date and machine data is created for each of a plurality of machines.

The estimation unit 22 performs a process of estimating a start-up period of each machine, a warming period of each machine, and a process period of each machine based on the machining date input to the input unit 10 and the data accumulated in the database unit 21.

The determination unit 30 performs a process of determining start-up start and end times of each machine and warming start and end times of each machine based on the machining start time and the largest number of the machines input to the input unit 10 and the start-up period of each machine, the warming period of each machine, and the process period of each machine calculated by the estimation unit 22.

The notification unit 40 notifies external devices of the start-up start and end times of each machine and the warming start and end times of each machine.

Next, information that the management system 100 according to the present embodiment can provide will be described with reference to FIGS. 5 and 6.

The management system 100 provides a start-up start time of each machine based on the data accumulated in the database unit 21 so that the warming start time for securing a shortest warming period necessary for each machine and a standby period between the end of a start-up operation of each machine and the start of a warming operation are accelerated as much as possible. Moreover, the management system 100 can provide a warming end time of each machine and a start-up end time of each machine as necessary.

Figure 5:
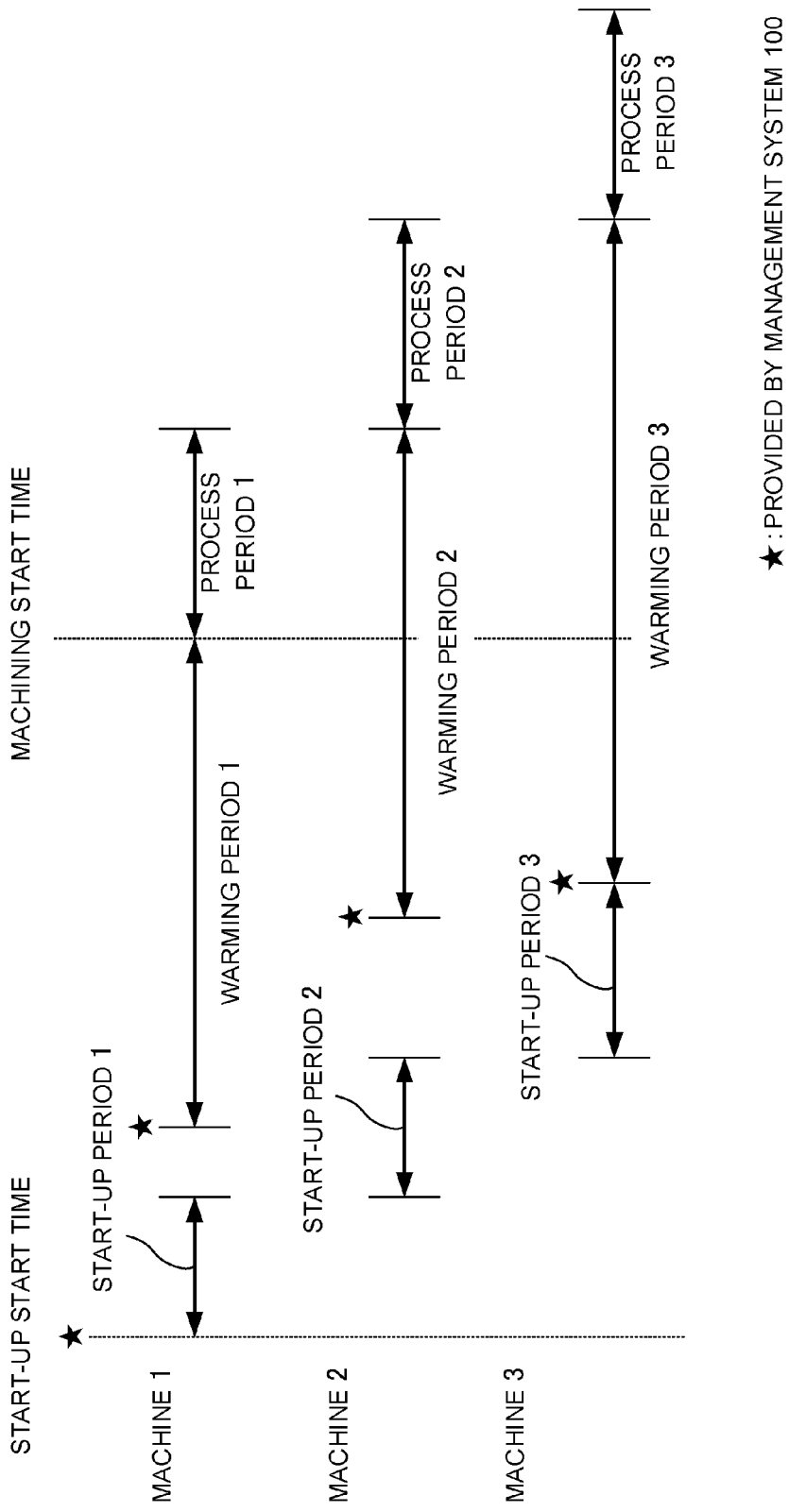
FIG. 5 is a diagram for describing information that the management system 100 can provide.

FIG. 5 is a time chart when there are three machines of which the machining start times are successive. In this case, the management system 100 provides at least a start-up start time indicated by a star mark in the drawing, a start time of warming period 1, a start time of warming period 2, and a start time of warming period 3.

Figure 6:
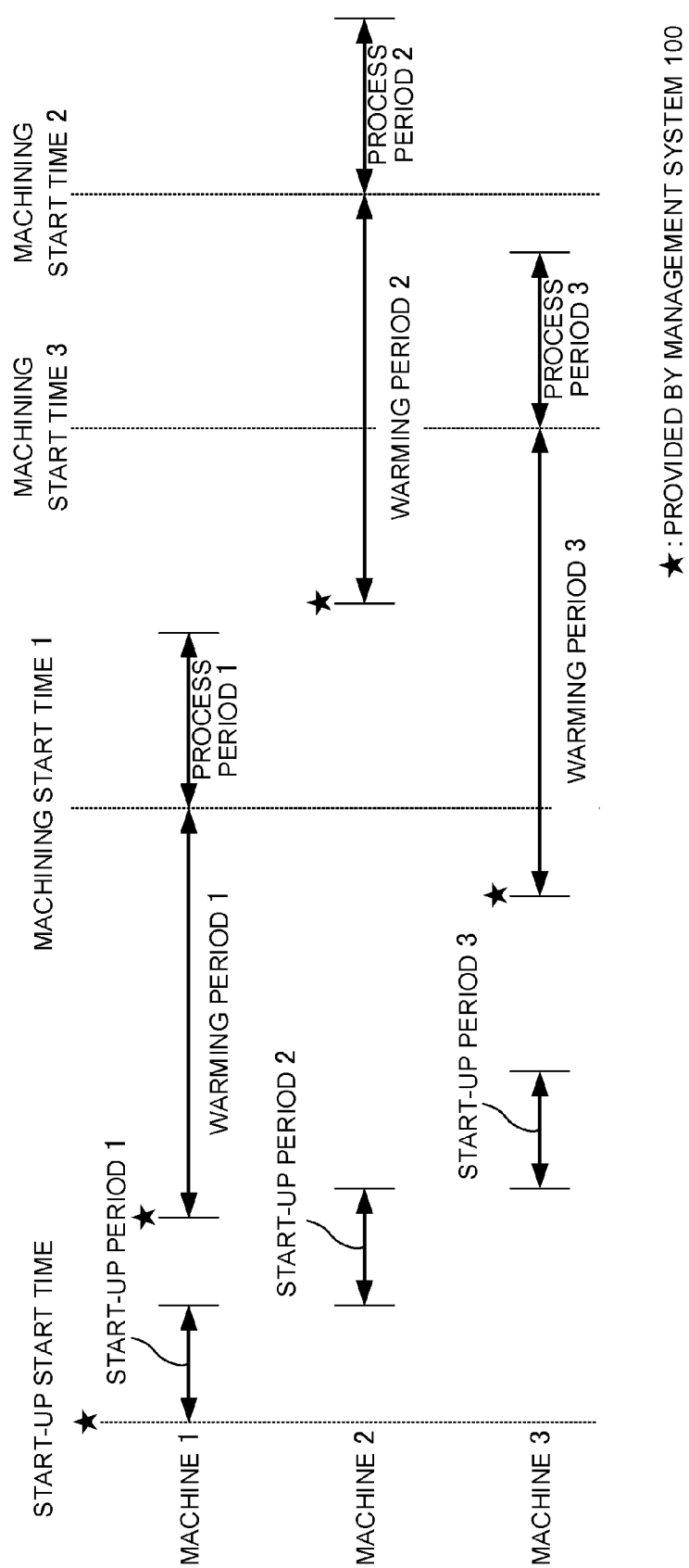
FIG. 6 is a diagram for describing information that the management system 100 can provide.

FIG. 6 is a time chart when there are three machines of which the machining start times are independent. In this case, the management system 100 provides at least a start-up start time indicated by a star mark in the drawing, a start time of warming period 1, a start time of warming period 2, and a start time of warming period 3.

Next, an operation of the management system 100 according to the present embodiment will be described.

Step 1:

The data collection unit 20 collects daily environment data (weather, room temperature, humidity, and the like) and daily data (a start-up period, a warming period, a process period, and the like) of each machine and accumulates the data in the database unit 21. As a method of allowing the data collection unit 20 to collect data, although the data may be collected from various sensors and may be collected from data sources on the Internet, a data collection method is not particularly limited.

Step 2:

The input unit 10 receives a machining date, a machining start time, and the largest number of the machines. Here, when the machining start times of respective machines are successive, it is assumed that the machining start time of machine 1 (that is, a machine in which a machining process starts first) is input as the machining start time. On the other hand, when the machining start times of respective machines are independent, the machining start time of each machine is input as the machining start time.

Step 3:

The estimation unit 22 estimates a start-up period of each machine, a warming period of each machine, and a process period of each machine based on the machining date input to the input unit 10 and the data accumulated in the database unit 21.

Figure 7:
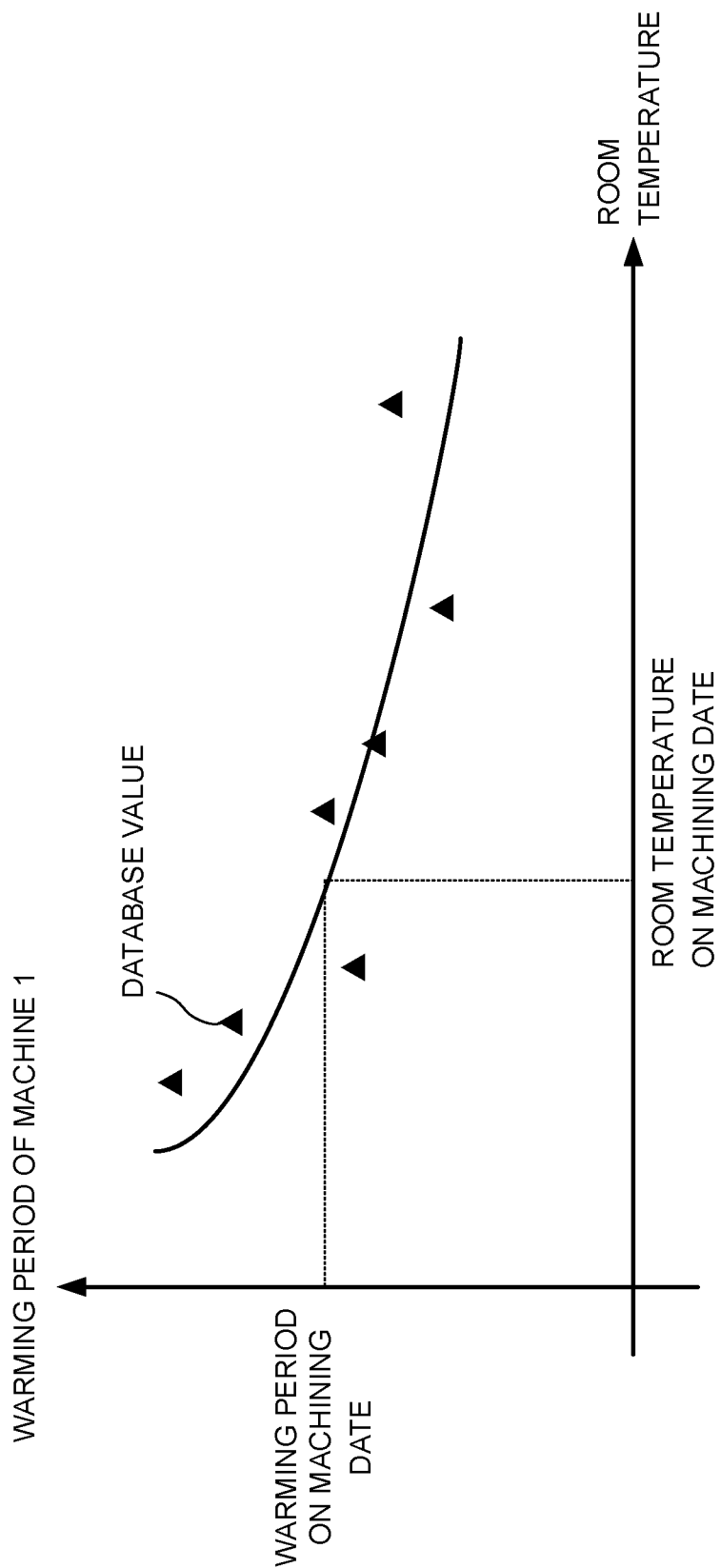
FIG. 7 is a diagram illustrating an approximation function indicating the relation between environment data and a warming period.

For example, the estimation unit 22 estimates the warming period of machine 1 by the following methods. First, the estimation unit 22 acquires a room temperature accumulated on a daily basis and the warming period of machine 1 from the database unit 21. Subsequently, the estimation unit 22 calculates an approximation function indicating the relation between a room temperature and the warming period of machine 1 (see FIG. 7). The approximation function can be calculated by a known method such as the least-squares method, for example. Moreover, the estimation unit 22 estimates a warming period on a machining date based on a room temperature of the machining date and the approximation function. The approximation function for calculating the warming period may be a multivariable function including humidity and the like as well as a room temperature.

The start-up period and the process period can be calculated by the same method. Alternatively, since it is considered that the start-up period and the process period do not depend remarkably on an environment condition (weather, room temperature, humidity, and the like), average values of the start-up periods and the process periods of each machine, accumulated in a database may be referred to as estimated values.

Alternatively, the estimation unit 22 may acquire environment data such as a room temperature or humidity at a machining time from a predetermined data source rather than acquiring the machining date from the input unit 10. Moreover, the estimation unit 22 may simply output a predetermined start-up period of each machine, a predetermined warming period of each machine, and a predetermined process period of each machine to simplify the process.

Step 4:

The determination unit 30 determines start-up start and end times of each machine and warming start and end times of each machine based on the machining start time and the largest number of the machines input to the input unit 10 and the start-up period of each machine, the warming period of each machine, and the process period of each machine estimated by the estimation unit 22.

A method of determining the warming start and end times of each machine when the machining start times of respective machines are successive will be described in detail with reference to Example 1-a to be described later. Moreover, a method of determining the warming start and end times of each machine when the machining start times of respective machines are independent will be described in detail with reference to Example 1-b to be described later. Moreover, a method of determining the start-up start and end times of each machine will be described in detail with reference to Example 2 to be described later.

Step 5:

The notification unit 40 notifies the operator of the warming start time of each machine and the start-up start time of each machine. Moreover, in order to prevent the operator from forgetting the warming operation, the notification unit 40 may send a notification indicating the end of the warming operation to the operator in synchronization with the warming end time.

As a typical notification method, although each time may be displayed on the screen, an audio alarm indicating the arrival of each time may be output, and a notification may be output to a mobile terminal of an operator, the present invention is not limited to this.

Step 6:

The operator starts a start-up operation in synchronization with the notified start-up start time of each machine. Moreover, the operator starts a warming operation in synchronization with the notified warming start time of each machine.

Alternatively, each machine may be put into a warming operation start standby state after a start-up operation of each machine ends, and each machine may automatically start a warming operation when the notification unit 40 directly notifies each machine of the start of the warming operation.

When a plurality of operators performs the start-up operation simultaneously, the above-described steps may be changed as follows. In step 5, the notification unit 40 notifies each operator of the start-up start and end times of each machine and the warming start and end times of each machine. Due to this, the management system 100 preferably holds a person in charge of operator and the notification destination in correlation with each machine. In step 6, each operator ends a start-up operation until a start-up end time of a predetermined machine to which the operator is allocated and starts a warming operation in synchronization with a warming start time of each machine.

Subsequently, a method of determining the warming start and end times of each machine and a method of determining the start-up start and end times of each machine in various cases will be described in detail as Examples.

Example 1-a

Figure 8:
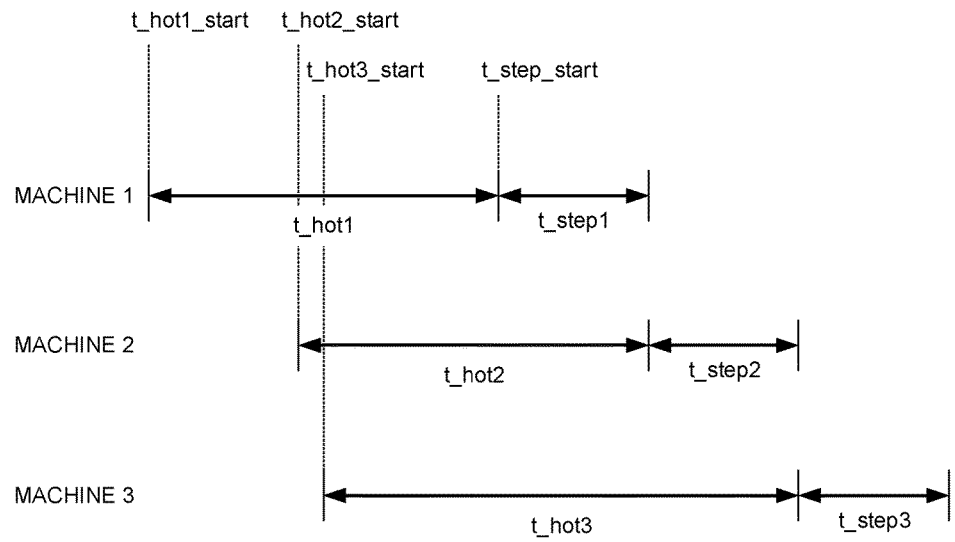
FIG. 8 is a time chart illustrating the relation between a warming period and a process period of each machine when the machining start times of respective machines are successive.

A method of determining the warming start and end times of each machine when the machining start times of the respective machines are successive will be described. For description, the following variables are defined. Here, it is assumed that machine 1 is a machine that starts a machining process first.

t_step_start: machining start time (machining start time of machine 1)

t_hot n_start: warming start time of machine n t_hot n: warming period of machine n t_step n: process period of machine n The time chart of FIG. 8 illustrates the relation between a warming period and a process period of each machine when the machining start times of respective machines are successive. From this time chart, it can be understood that the warming start time t_hot n_start of machine n is calculated by the following expression.

$t\_hot1\_start = t\_step\_start - t\_hot1$ $t\_hot2\_start = (t\_step\_start + t\_step1) - t\_hot2$ $t\_hot3\_start = (t\_step\_start + t\_step1 + t\_step2) - t\_hot3$ That is, $$t\_hot\ n\_start = \left( t\_step\_start + \sum_{k=0}^{n-1} t\_stepk \right) - t\_hotn \quad \text{[Expression 1]}$$

here, t_step0=0.

Furthermore, when the warming end time of machine n is defined as t_hot n_end, t_hot n_end is calculated by the following expression.

$t\_hot\ n\_end = t\_hot\ n\_start + t\_hot\ n$

Example 1-b

Figure 9:
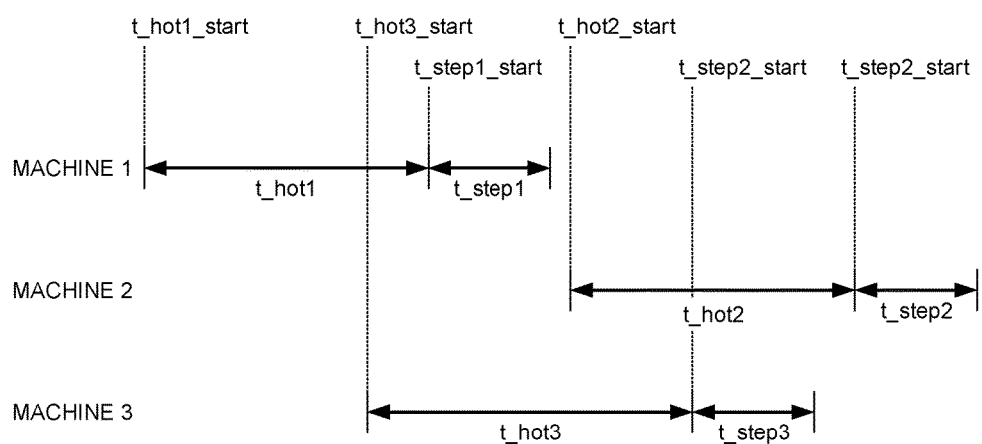
FIG. 9 is a time chart illustrating the relation between a warming period and a process period of each machine when the machining start times of respective machines are independent.

A method of determining the warming start and end times of each machine when the machining start times of respective machines are independent will be described. The following variables are defined for explanation.

t_step n_start: machining start time of machine n t_hot n_start: warming start time of machine n t_hot n: warming period of machine n t_step n: process period of machine n The time chart of FIG. 9 illustrates the relation between the warming period and the process period of each machine when the machining start times of respective machines are independent. From this time chart, it is understood that the warming start time t_hot n_start of machine n is calculated by the following expression.

$t\_hot1\_start = t\_step1\_start - t\_hot1$ $t\_hot2\_start = t\_step2\_start - t\_hot2$ $t\_hot3\_start = t\_step3\_start - t\_hot3$ that is, $t\_hot\ n\_start = t\_step\ n\_start - t\_hot\ n$ Furthermore, when the warming end time of machine n is defined as t_hot n_end, t_hot n_end is calculated by the following expression.

$t\_hot\ n\_end = t\_hot\ n\_start + t\_hot\ n$

Example 2

A method of determining the start-up start and end times of each machine will be described. For description, the following variables will be described in addition to the variables defined in Example 1.

t_set1_start_Mn: start-up start time of machine 1 when there are n machines t_set n: start-up period of machine n t_set n_end: start-up end time of machine n In this example, first, the start-up start time of machine 1 when there is one machine is calculated, and subsequently, the start-up start time of machine 1 when there are two or more machines is calculated, and the start-up start time of machine 1 when there are n machines is calculated according to a sequential method.

(1) When there is One Machine

Figure 10:
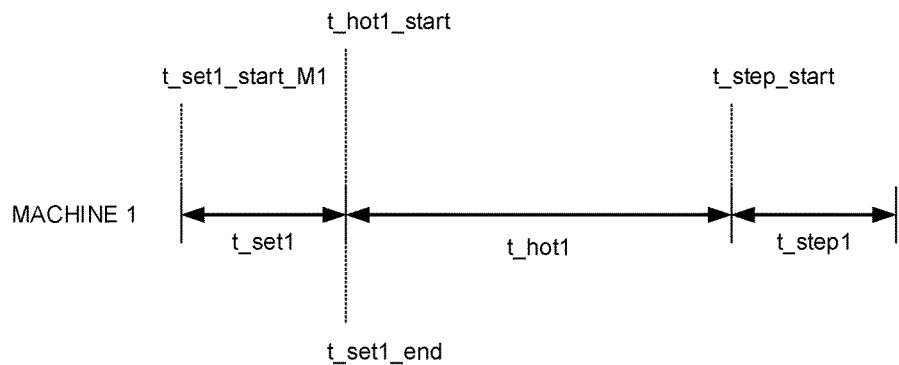
FIG. 10 is a time chart illustrating the relation between a start-up period, a warming period, and a process period when the number of machines is 1.

The time chart of FIG. 10 illustrates the relation between the start-up period, the warming period, and the process period when there is one machine. From this time chart, it is understood that the start-up start time of machine 1 when there is one machine is calculated by the following expression.

$$t\_set1\_start\_M1 = t\_hot1\_start - t\_set1$$

Figure 11:
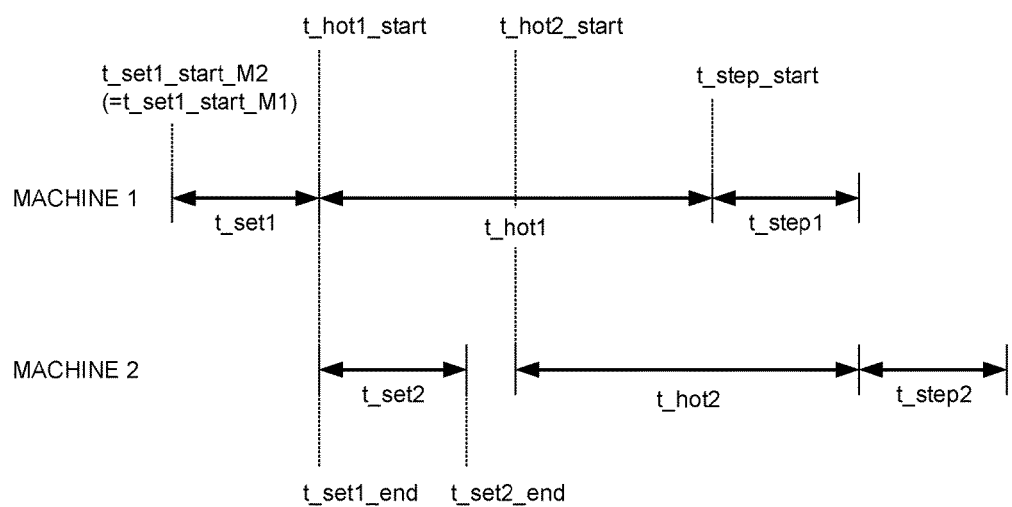
FIG. 11 is a time chart illustrating the relation between a start-up period, a warming period, and a process period when the number of machines is 2.

(2) When there are Two Machines (2-1) The time chart of FIG. 11 illustrates the relation between the start-up period, the warming period, and the process period of each machine when there are two machines, t_hot1_start<t_hot2_start, and, t_set2_end<t_hot2_start. From this time chart, it is understood that the start-up start time of machine 1 for condition (2-1) is calculated by the following expression.

$$t\_set1\_start\_M2 = t\_set1\_start\_M1$$

Figure 12:
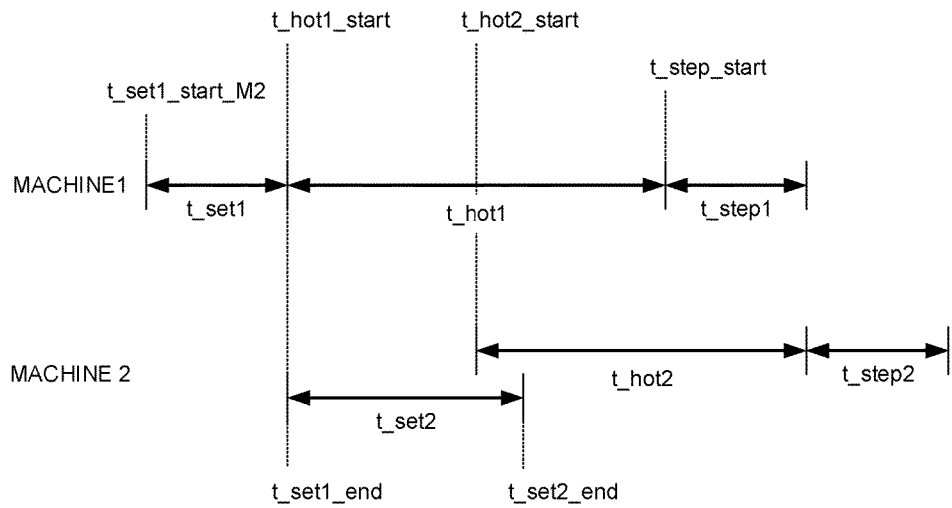
FIG. 12 is a time chart illustrating the relation between a start-up period, a warming period, and a process period when the number of machines is 2.

(2-2) The time chart of FIG. 12 illustrates the relation between the start-up period, the warming period, and the process period of each machine when there are two machines, t_hot1_start<t_hot2_start, and, t_set2_end>=t_hot2_start. In this case, it is necessary to change the time chart similarly to FIG. 13 so that t_hot2_start is positioned later than t_set2_end.

Figure 13:
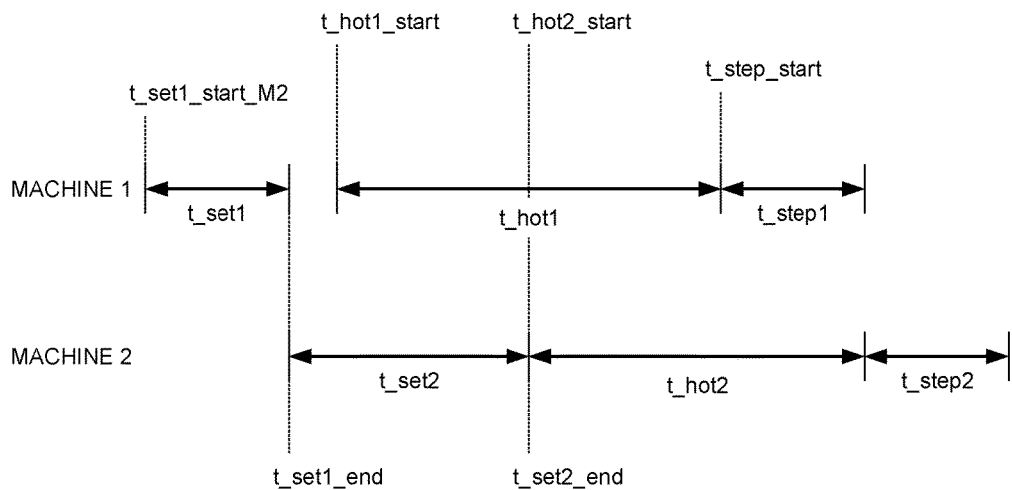
FIG. 13 is a time chart illustrating the relation between a start-up period, a warming period, and a process period when the number of machines is 2.

From the time chart of FIG. 13, it is understood that the start-up start time of machine 1 for condition (2-2) is calculated by the following expression.

$$t\_set1\_start\_M2 = t\_hot2\_start - \sum_{k=1}^{2} t\_setk \quad \text{[Expression 2]}$$

Figure 14:
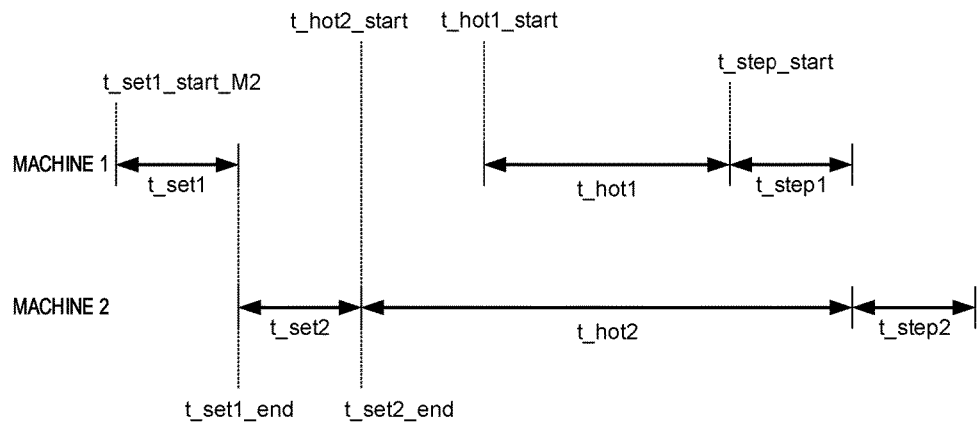
FIG. 14 is a time chart illustrating the relation between a start-up period, a warming period, and a process period when the number of machines is 2.

(2-3) The time chart of FIG. 14 illustrates the relation between the start-up period, the warming period, and the process period of each machine when there are two machines and t_hot1_start>=t_hot2_start. From this time chart, it is understood that the start-up start time of machine 1 for condition (2-3) is calculated by the following expression.

$$t\_set1\_start\_M2 = t\_hot2\_start - \sum_{k=1}^{2} t\_setk \quad \text{[Expression 3]}$$

From (2-1) to (2-3), the start-up start time t_set1_start_M2 of machine 1 when there are two machines is the earlier time of the following times.

$$t\_set1\_start\_M2 = t\_set1\_start\_M1 \quad \text{[Expression 4-1]}$$

$$t\_set1\_start\_M2 = t\_hot2\_start - \sum_{k=1}^{2} t\_setk \quad \text{[Expression 4-2]}$$

Figure 15:
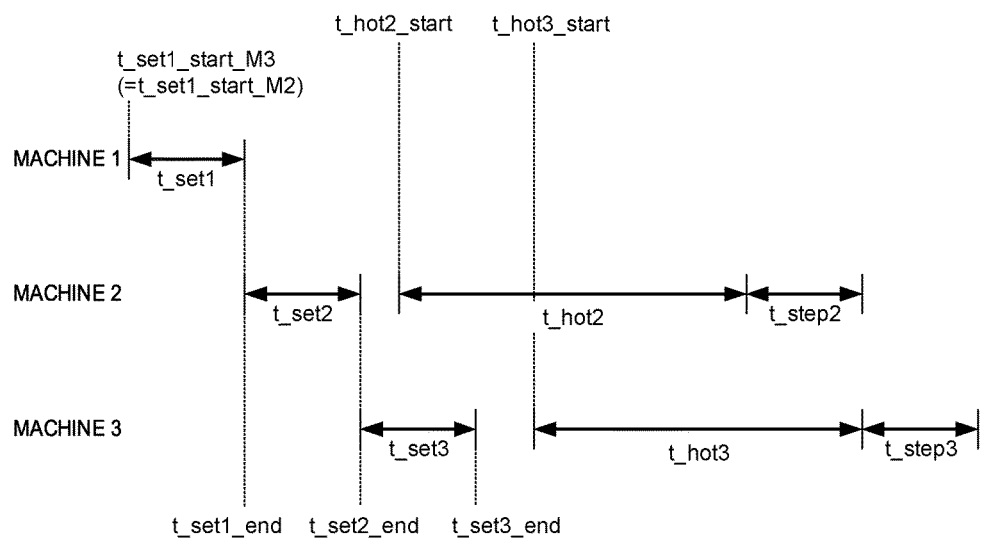
FIG. 15 is a time chart illustrating the relation between a start-up period, a warming period, and a process period when the number of machines is 3.

(3) When there are Three Machines (3-1) The time chart of FIG. 15 illustrates the relation between the start-up period, the warming period, and the process period of each machine when there are three machines, t_hot2_start<t_hot3_start, and, t_set3_end<t_hot3_start. From this time chart, it is understood that the start-up start time of machine 1 for condition (3-1) is calculated by the following expression.

$$t\_set1\_start\_M3 = t\_set1\_start\_M2$$

Figure 16:
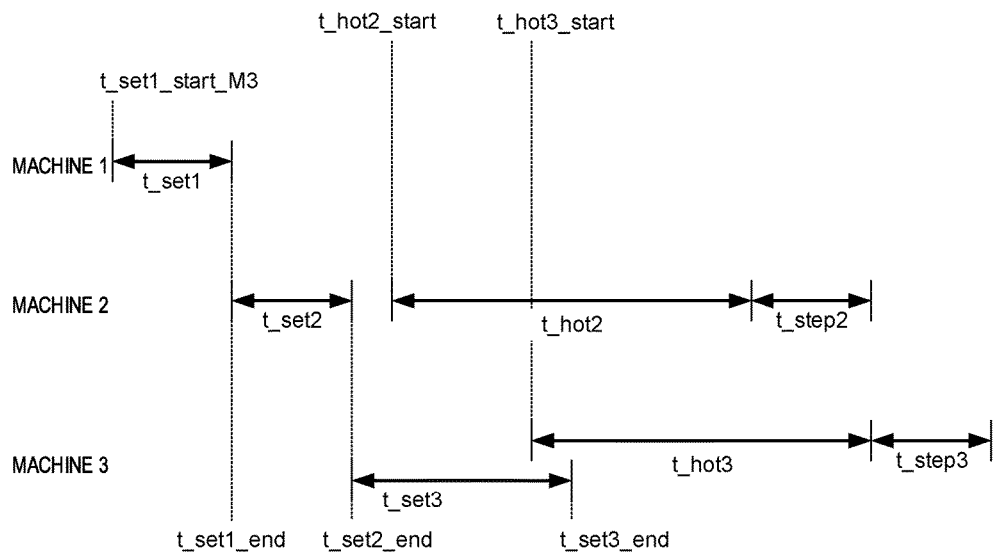
FIG. 16 is a time chart illustrating the relation between a start-up period, a warming period, and a process period when the number of machines is 3.

(3-2) The time chart of FIG. 16 illustrates the relation between the start-up period, the warming period, and the process period of each machine when there are three machines, t_hot2_start<t_hot3_start, and, t_set3_end>=t_hot3_start. In this case, it is necessary to change the time chart similarly to FIG. 17 so that t_hot3_start is positioned later than t_set3_end.

Figure 17:
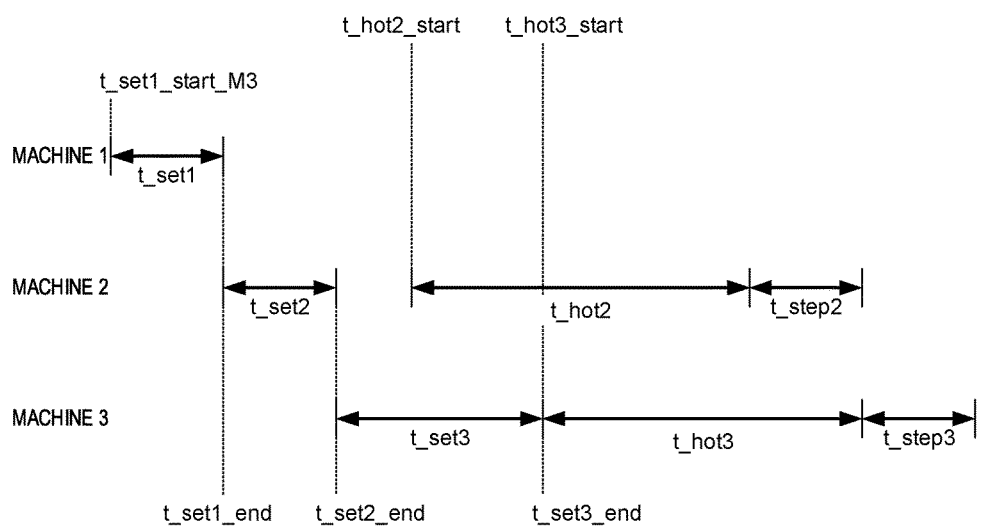
FIG. 17 is a time chart illustrating the relation between a start-up period, a warming period, and a process period when the number of machines is 3.

From the time chart of FIG. 17, it is understood that the start-up start time of machine 1 for condition (3-2) is calculated by the following expression.

$$t\_set1\_start\_M3 = t\_hot3\_start - \sum_{k=1}^{3} t\_setk \quad \text{[Expression 5]}$$

Figure 18:
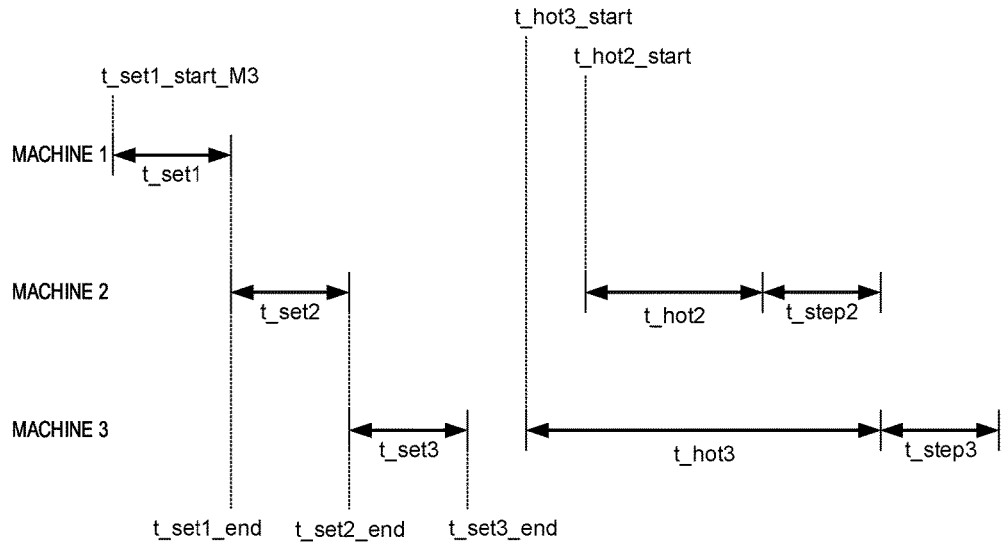
FIG. 18 is a time chart illustrating the relation between a start-up period, a warming period, and a process period when the number of machines is 3.

(3-3) The time chart of FIG. 18 illustrates the relation between the start-up period, the warming period, and the process period of each machine when there are three machines, t_hot2_start>=t_hot3_start, and, t_set3_end<t_hot3_start. From this time chart, it is understood that the start-up start time of machine 1 for condition (3-3) is calculated by the following expression.

$$t\_set1\_start\_M3 = t\_set1\_start\_M2$$

Figure 19:
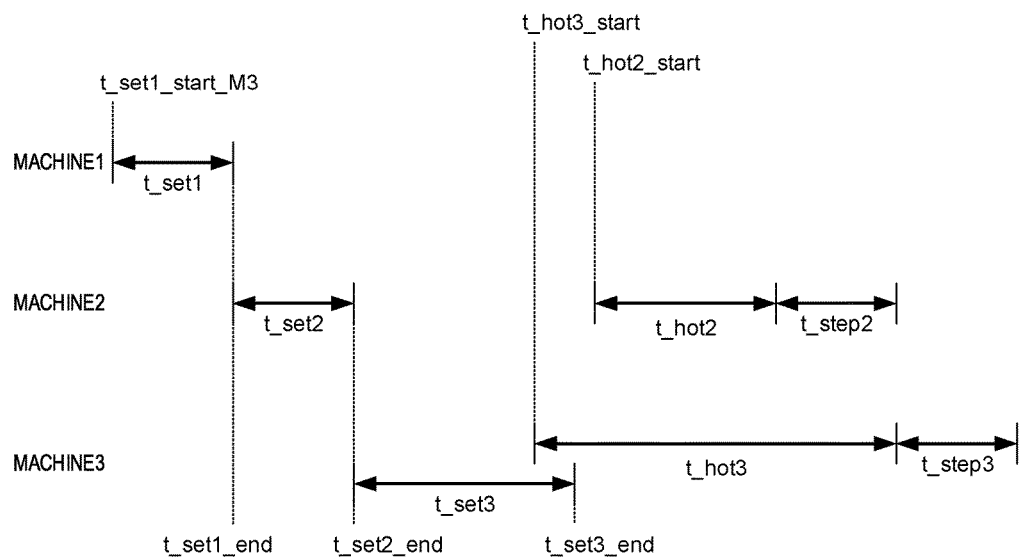
FIG. 19 is a time chart illustrating the relation between a start-up period, a warming period, and a process period when the number of machines is 3.

(3-4) The time chart of FIG. 19 illustrates the relation between the start-up period, the warming period, and the process period of each machine when there are three machines, t_hot2_start>=t_hot3_start, and, t_set3_end>=t_hot3_start. In this case, it is necessary to change the time chart similarly to FIG. 20 so that t_hot3_start is positioned later than t_set3_end.

Figure 20:
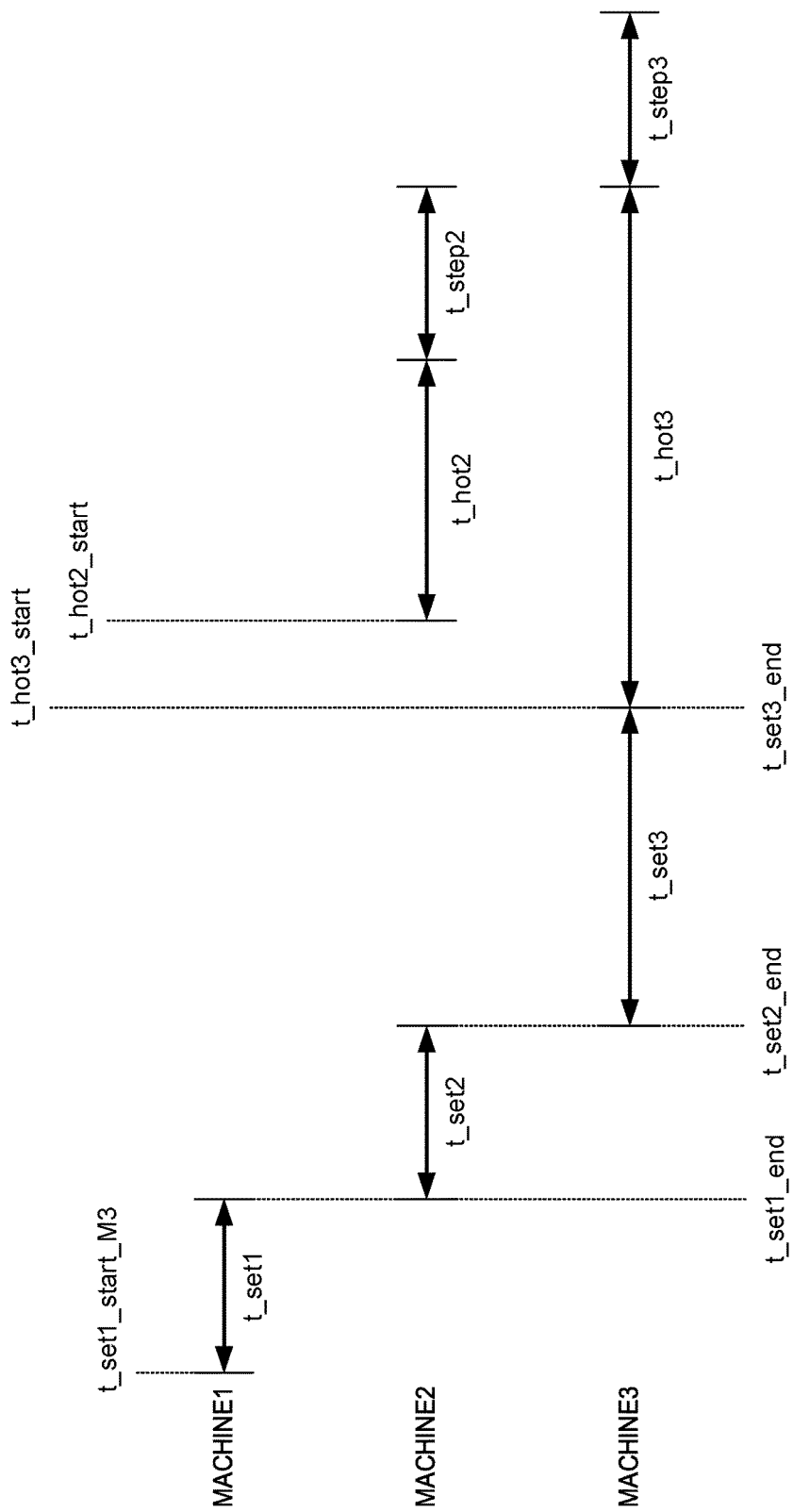
FIG. 20 is a time chart illustrating the relation between a start-up period, a warming period, and a process period when the number of machines is 3.

From the time chart of FIG. 20, it is understood that the start-up start time of machine 1 for condition (3-4) is calculated by the following expression.

$$t\_set1\_start\_M3 = t\_hot3\_start - \sum_{k=1}^{3} t\_setk \quad \text{[Expression 6]}$$

From (3-1) to (3-4), the start-up start time of machine 1 when there are three machines is the earlier time of the following times.

$$t\_set1\_start\_M3 = t\_set1\_start\_M2 \quad \text{[Expression 7-1]}$$

$$t\_set1\_start\_M3 = t\_hot3\_start - \sum_{k=1}^{3} t\_setk \quad \text{[Expression 7-2]}$$

Figure 21:
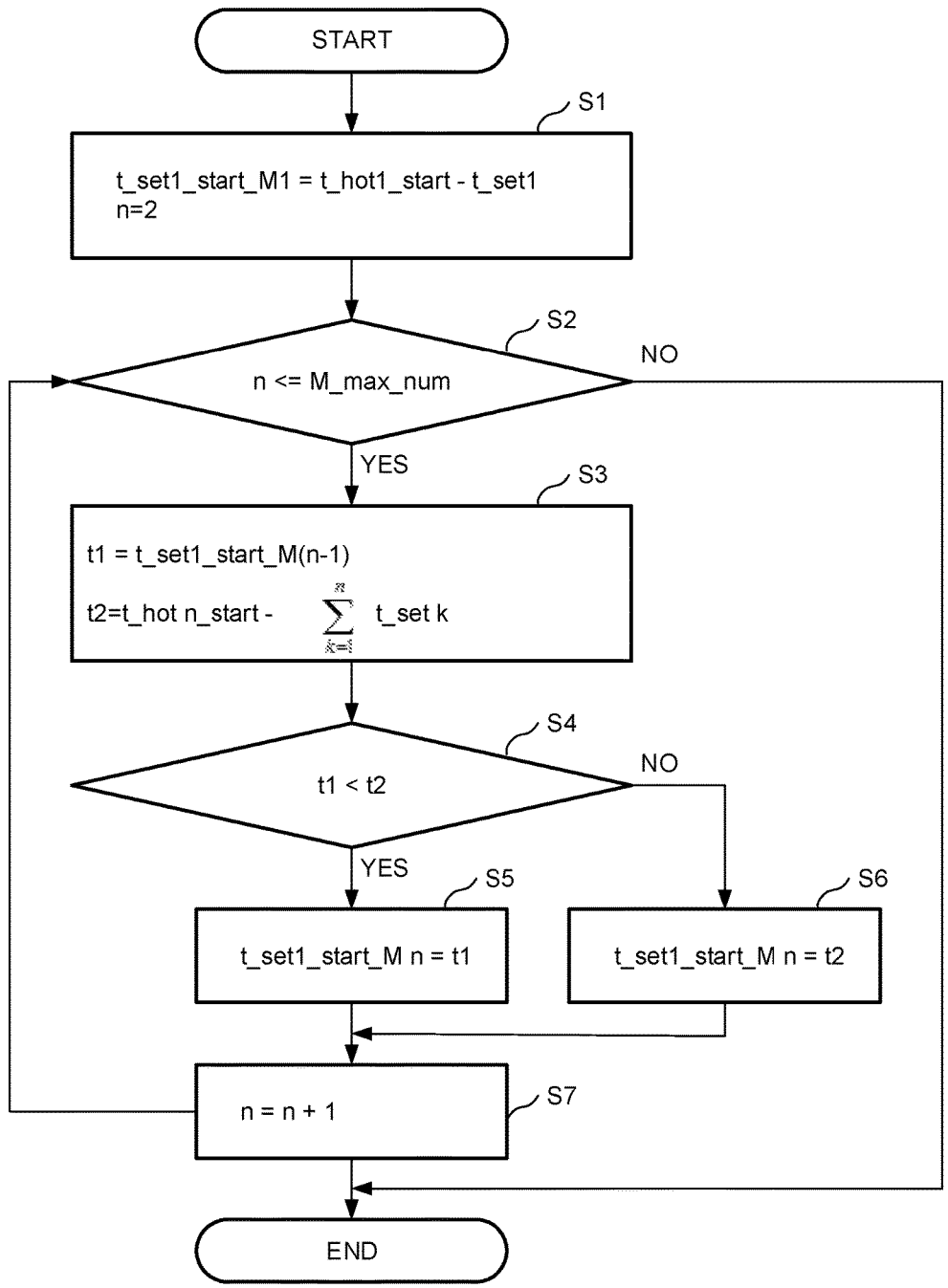
FIG. 21 is a flowchart illustrating the procedure of determining a start-up start time of a machine when there are two or more machines.

From (2) and (3), the start-up start time t_set1_start_M n (n>=2) of a machine when there are two or more machines can be determined by the flowchart illustrated in FIG. 21. Here, variables are defined as follows.

n: variation indicating machine number
M_max_num: largest number of machines
t1, t2: variation indicating time Step S1:
t_hot1_start−t_set1 is set to t_set1_start_M1. Moreover, 2 is set to n as an initial value.

Step S2:
When n is equal to or smaller than M_max_num, the flow proceeds to step S3. In other cases, the process ends.

Step S3:
t_set1_start_M(n−1) is set to t1. Moreover, $$t\_hot\ n\_start - \sum_{k=1}^{n} t\_setk \quad \text{[Expression 8]}$$

is set for t2.

Step S4:

When t1 is smaller than t2, the flow proceeds to step S5. In other cases, the flow proceeds to step S6.

Step S5:

t1 is set to t_set1_start_M n.

Step S6:

t2 is set to t_set1_start_M n.

Step S7:

1 is added to n, and the flow proceeds to step S2.

Furthermore, when the start-up start time of machine n is defined as t_set n_start, the start-up start time t_set n_start of machine n and the start-up end time t_set n_end of machine n when there are M_max_num machines are calculated by the following expressions.

$$t\_set\ n\_start = t\_set1\_start\_M(M\_max\_num) + \sum_{k=1}^{n-1} t\_setk \quad \text{[Expression 9]}$$

$$t\_set\ n\_end = t\_set1\_start\_M(M\_max\_num) + \sum_{k=1}^{n} t\_setk \quad \text{[Expression 10]}$$

The above-described calculation expressions do not depend on the machining start time t_step n_start of machine n and the process period t_step n of machine n. Therefore, the above-described calculation expressions can be applied to either a case in which the machining start times of respective machines are successive or a case in which the machining start times of respective machines are independent.

According to the present embodiment, the management system 100 provides the optimal warming start times of a plurality of machines. In this way, it is possible to cut an unnecessary warming operation of each machine and prevent unnecessary power consumption.

Moreover, according to the present embodiment, the management system 100 can provide the optimal start-up start time when the machining start times of respective machines are successive as in a machining line and when the machining start times of respective machines are independent.

The present invention is not limited to the above-described embodiments but can be changed in such a way that constituent elements are substituted, omitted, and added and the order is switched without departing from the spirit of the present invention.

The invention claimed is:

1. A management system executed by a processor that outputs a start-up start time and a warming start time of a plurality of machines, the management system comprising:
an input unit that receives input of a machining date, a machining start time and a maximum number of the machines;
an estimation unit that estimates a start-up period, a warming period, and a process period of each of the plurality of machines based on the machining date input;
a determination unit that determines a start-up start time and a warming start time of each of the plurality of machines based on the machining date, the machining start time, the maximum number of the machines, the start-up period, the warming period, and the process period; and
a notification unit that notifies to an operator the start-up start time and the warming start time.

2. The management system according to claim 1, wherein the determination unit further determines a start-up end time and a warming end time of each of the plurality of machines, and
the notification unit further notifies the start-up end time and the warming end time.

3. The management system according to claim 1, wherein the input unit receives input of the machining start time of each of the plurality of machines.

4. The management system according to claim 1, further comprising:
a data collection unit that collects daily environment data and a start-up period, a warming period, and a process period of each of the machines; and
a database unit that accumulates the daily environment data at a predetermined time in correlation with the start-up period, the warming period, and the process period at the predetermined time, wherein
the estimation unit estimates the start-up period, the warming period, and the process period of each of the plurality of machines based on the daily environment data during a machining time and the daily environment data and the start-up period, the warming period, and the process period accumulated in the past in the database unit.

5. The management system according to claim 4, wherein the input unit further receives input of information indicating a machining time.

6. The management system according to claim 1, wherein the notification unit notifies the start-up start time, the warming start time, the start-up end time, and the warming end time via audio or screen display.

7. The management system according to claim 6, wherein the notification unit notifies the start-up start time, the warming start time, the start-up end time, and the warming end time associated with each of the plurality of machines to a notification destination determined for each of the plurality of machines.

8. The management system according to claim 1, wherein the notification unit sends a notification to the machine of which the warming start time has arrived.

\* \* \* \* \*